US 6,697,469 B1

(12) United States Patent
Koster

(10) Patent No.: US 6,697,469 B1
(45) Date of Patent: Feb. 24, 2004

(54) METHOD AND SYSTEM FOR IMPLEMENTING CALLING-PARTY-PAYS TELECOMMUNICATION SERVICES

(75) Inventor: Karl Koster, Atlanta, GA (US)

(73) Assignee: Bellsouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/137,027

(22) Filed: Aug. 20, 1998

(51) Int. Cl.[7] .............................................. H04M 15/00
(52) U.S. Cl. .............................. 379/114.29; 379/127.01; 379/121.01; 379/127.02; 379/221.13; 379/114.05; 379/114.21; 379/115.01; 455/406
(58) Field of Search ................................. 379/112, 113, 379/114, 115, 229, 230, 231, 114.21, 114.23, 114.22, 114.28, 127.01, 127.03, 127.04, 114.15, 114.19, 127.05, 127.02, 221.13, 221.14, 221.1, 220.01, 221.08; 455/405, 406, 432, 433

(56) References Cited

U.S. PATENT DOCUMENTS

| | | | | |
|---|---|---|---|---|
| 4,756,020 A | * | 7/1988 | Fodale ................... | 379/114.19 |
| 5,557,664 A | * | 9/1996 | Burns et al. ............... | 379/114 |
| 5,579,379 A | | 11/1996 | D'Amico et al. | |
| 5,661,792 A | * | 8/1997 | Akinpelu et al. ........... | 379/221 |
| 5,699,416 A | * | 12/1997 | Atkins ................... | 379/127.04 |
| 5,742,667 A | | 4/1998 | Smith | |
| 5,748,717 A | * | 5/1998 | Chan et al. .............. | 379/120 |
| 5,774,533 A | * | 6/1998 | Patel ..................... | 379/127 |
| 5,854,836 A | * | 12/1998 | Nimmagadda .............. | 379/207 |
| 5,867,570 A | * | 2/1999 | Bargout et al. ............ | 379/207 |
| 6,097,801 A | * | 8/2000 | Williams et al. ........... | 379/207 |
| 6,169,891 B1 | * | 1/2001 | Gorham et al. ............ | 379/114 |
| 6,263,056 B1 | * | 7/2001 | Gruchala et al. ........... | 379/144 |

FOREIGN PATENT DOCUMENTS

DE 19515418 A 10/1996

* cited by examiner

Primary Examiner—Rexford Barnie
(74) Attorney, Agent, or Firm—Walters & Zimmerman; Geoff Sutcliffe; Todd Mitchem

(57) ABSTRACT

A calling-party-pays gateway operative for billing a surcharge for a telecommunication service to an account associated with a calling line number. The calling-party-pays gateway is configured for connection between a telephone system and a switch servicing a group of terminating stations such that all communications directed to terminating stations serviced by the switch are routed through the gateway. When the gateway receives a connection request defining a communication directed to a terminating station serviced by the switch, the gateway determines whether the terminating station is associated with an account that requires the surcharge to be billed to the account associated with the calling line number. If the terminating station is associated with an account that requires the surcharge to be billed to the account associated with the calling line number, the gateway determines whether the account associated with the calling line number is pre-approved to receive the surcharge. If the account associated with the calling line number is pre-approved to receive the surcharge, the gateway routes the communication to the terminating station and creates an accounting record billing the surcharge to the account associated with the calling line number.

17 Claims, 11 Drawing Sheets

VOICE CHANNEL VERSION

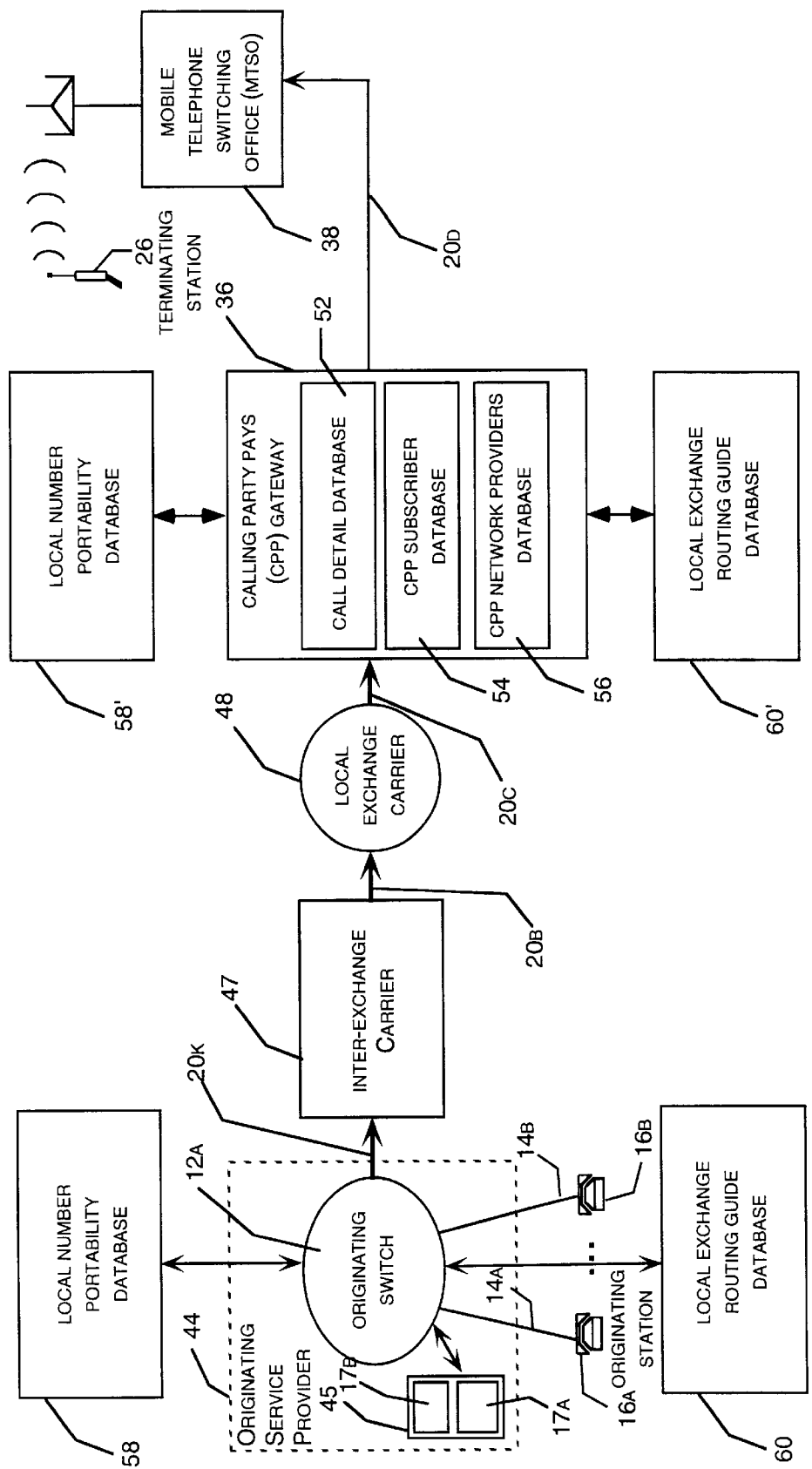

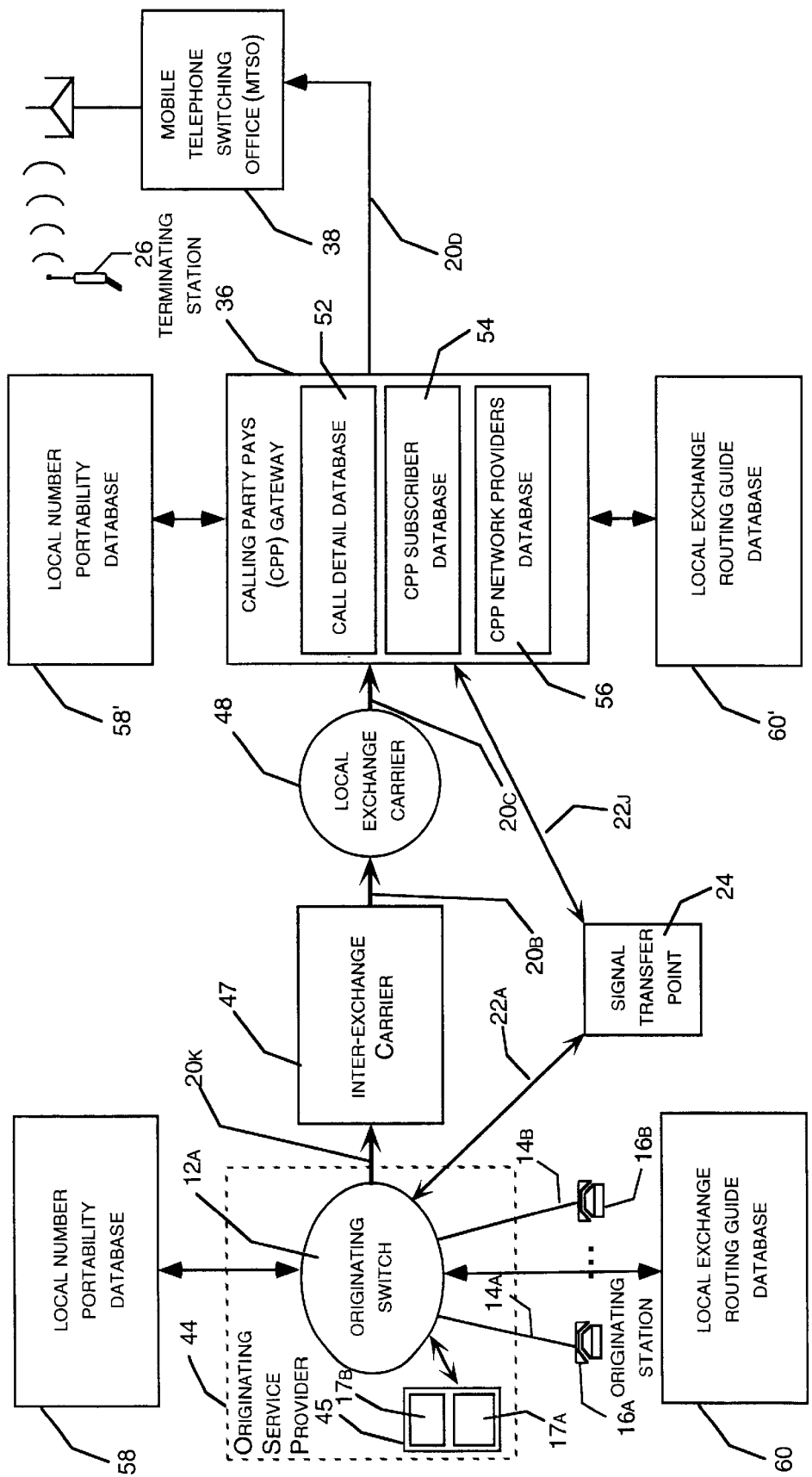
FIG. 2b SIGNALLING CHANNEL VERSION

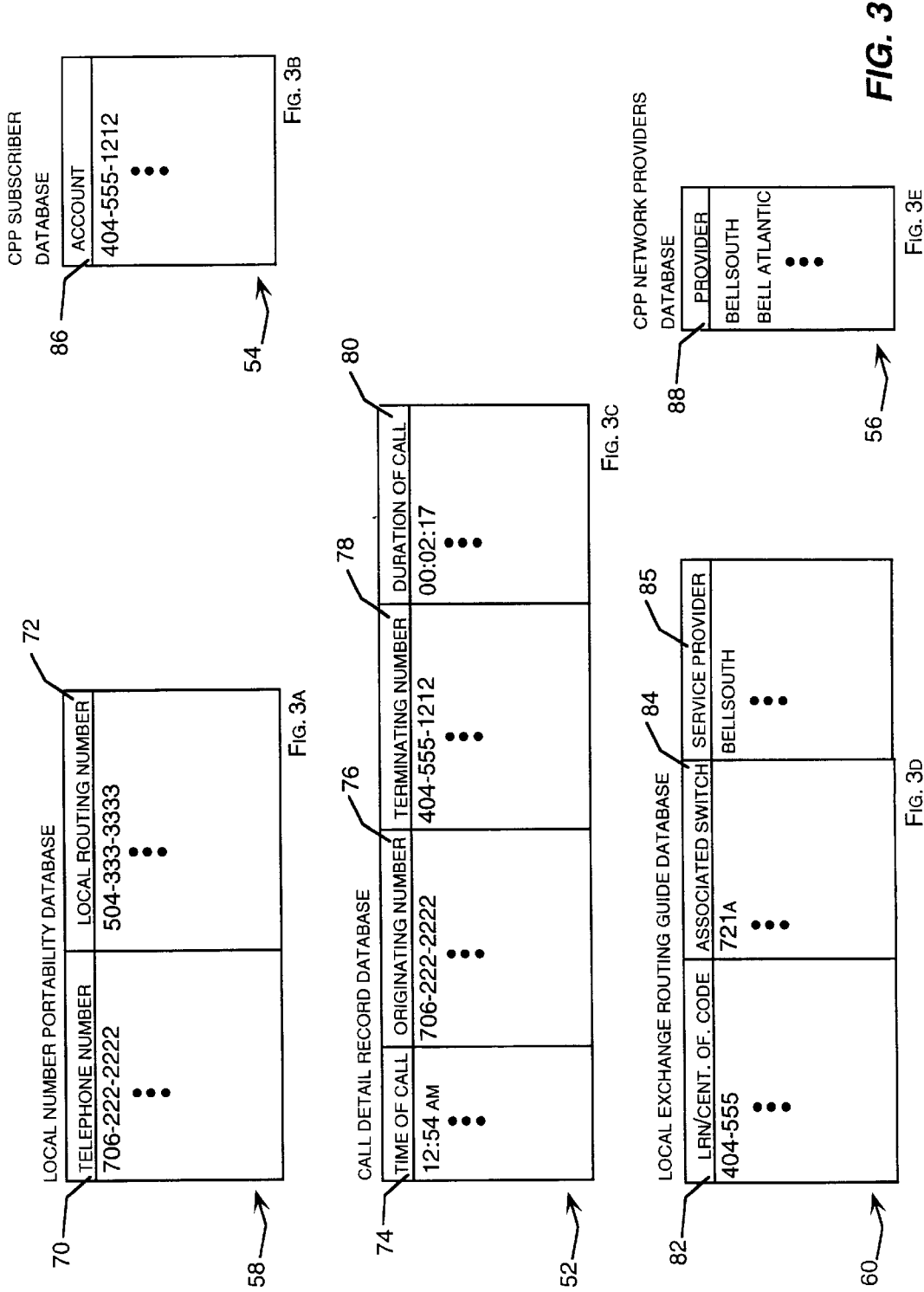

VOICE CHANNEL VERSION

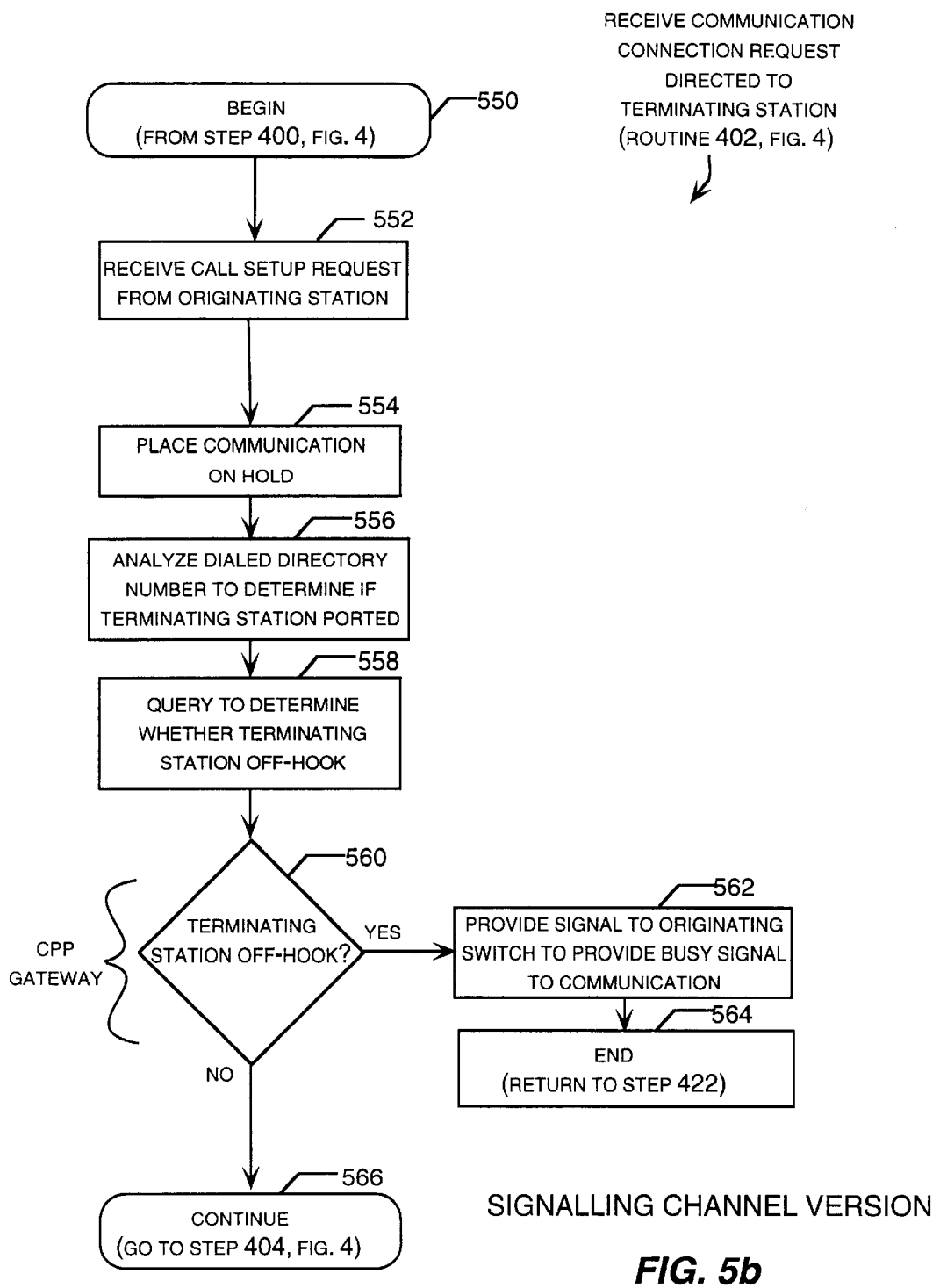

VOICE CHANNEL VERSION

SIGNALLING CHANNEL VERSION

METHOD AND SYSTEM FOR IMPLEMENTING CALLING-PARTY-PAYS TELECOMMUNICATION SERVICES

TECHNICAL FIELD

The present invention relates generally to a telecommunications system that implements "calling-party-pays" telecommunication services, and more particularly, relates to a telecommunications gateway that bills a surcharge associated with a telecommunication service to an account associated with a calling line number.

BACKGROUND OF THE INVENTION

"Calling-party-pays" is a telecommunications service in which calling parties are billed surcharges for calls that they originate. The surcharge is typically a cost that normally is charged to the called party, such as airtime charges normally billed to a wireless called party telephone or a pager. In concept, the calling-party-pays service is similar to services such as "900" and "976" numbers in which an additional surcharge is billed to the calling party for calls placed to these telephone numbers. With the calling-party-pays service, however, any destination number can result in an additional surcharge to the calling party. That is, the calling-party-pays service is not limited to calls placed to certain predetermined area codes or exchanges such as "900" or "976."

For instance, if a calling party originates a call to the telephone number of a wireless subscriber, who is also a calling-party-pays service subscriber, an announcement is played indicating that the calling party must incur an additional charge for the call to be completed. The calling party may then accept or decline the additional charge. If the calling party chooses to accept the charge, the call is connected to the wireless subscriber and a surcharge is billed to the calling party's telephone account. Typically, the surcharge billed to the calling party's account is an amount equal to the wireless subscriber's airtime fees. That is, the calling party, rather than the called party, is billed for the called party's air time.

A wireline local exchange carrier (LEC) generally implements the calling-party-pays telecommunications service on behalf of a wireless carrier. This is because the LEC has the ability to play announcements and to accept the calling party's choice as to whether to accept the additional charge. If the calling party accepts the additional charge, the LEC connects the call to the wireless carrier and bills the calling party. The LEC then shares a portion of the fees collected from the calling party with the wireless carrier. Therefore, the LEC must currently agree to provide the network infrastructure and billing services required to implement the calling-party-pays service. Many LECs currently refuse to provide the additional network infrastructure due to the expense involved. As a result, the wireless carrier is often unable to offer the calling-party-pays service to its subscribers The calling-party-pays telecommunications service is also hampered by a host of technical difficulties associated with current implementations of the service. The most problematic among these technical difficulties is "leakage." Leakage occurs when the telecommunication system completes a call to a calling-party-pays subscriber from an originating line that is not associated with an account that can be charged for the call. For example, originating lines such as hotel/motel phones, pay phones, and prison phones cannot typically originate calls to calling-party-pays subscribers because the owners of these phones are generally unwilling to incur surcharges. If calls erroneously complete to a calling-party-pays subscriber from these types of originating phones, leakage occurs because there is no account to receive the surcharge. This causes the wireless carrier to lose the revenue for the call.

Leakage may also occur when a call is routed to a calling-party-pays subscriber from a LEC that does not have an agreement to perform billing and collecting functions on behalf of the wireless carrier. In this case, the lack of a billing arrangement renders the surcharges uncollectable. The wireless carrier also loses revenue for these calls. The advent of local telephony competition results in the potential for multiple LECs to serve the same geographic area.

Local number portability also complicates the widespread implementation of calling-party-pays services. Typically, the LEC implementing the calling-party-pays service on behalf of a wireless carrier assigns a dedicated central office code NPA-NXX block to the wireless carrier and assigns directory numbers within this block to calling-party-pays subscribers (a group of 10,000 directory numbers having the same first six digits is referred to as an "NPA-NXX"). The LEC dedicates the NPA-NXX block to servicing calling-party-pays subscribers and, therefore, the LEC applies the calling-party-pays service to all calls directed to numbers within the dedicated NPA-NXX. When the switch servicing the numbers within the dedicated NPA-NXX routes a call to the wireless carrier, the wireless carrier assumes that the calling party has authorized a surcharge for the call to be billed to an account associated with the calling line number.

The advent of local number portability makes it impractical for the wireless carrier to rely on this assumption because local number portability allows telephone service subscribers to change their local telephone service provider while retaining the same directory number. Therefore, directory numbers in the dedicated NPA-NXX block can now "port out" to another service provider that may not provide the calling-party-pays network infrastructure, or may not have a billing arrangement with the wireless carrier. As a result, a wireless carrier can no longer assume that a given NPA-NXX will be treated as "calling party pays" by the LEC.

Accordingly, there is a need for a telecommunications device that allows a wireless carrier to implement calling-party-pays services. There is also a need for a method and system for implementing calling-party-pays services that reduces leakage. Additionally there is a need for a method and system for providing calling-party-pays services in a local-number-portability environment.

SUMMARY OF THE INVENTION

The present invention meets the needs described above by providing a method, system, and apparatus for billing a surcharge associated with a telecommunication service to an account associated with a calling line number. This advantageously allows a service provider other than a wireline local exchange carrier, such as a wireless carrier, to provide the calling-party-pays service without requiring the local exchange carrier to implement any new network functions. The invention also eliminates certain types of "leakage" by preventing calling-party-pays calls from erroneously completing from originating stations that are not approved to receive a surcharge. The invention also avoids connecting calling-party-pays calls from local exchange carriers that do not have billing arrangements with the service provider. Moreover, the invention can implement calling-party-pays services in a local-number-portability environment.

Generally described, the present invention includes a gateway for billing a surcharge to an account associated with a calling line number. The gateway is configured for connection between a telephone system and one or more switches servicing a group of terminating stations, such as wireless telephones. Locating the gateway in this position allows the gateway to intercept and process all communications directed to the terminating stations serviced by these switches.

When the gateway receives a connection request defining a communication directed to a terminating station serviced by one of these switches, the gateway determines whether the terminating station is associated with an account that requires the surcharge to be billed to an account associated with the calling line number. That is, the gateway determines if the account associated with the terminating station is a calling-party-pays account. According to an aspect of the present invention, the gateway may consult a database containing account information for accounts associated with terminating stations serviced by switches connected to the gateway. In particular, this database indicates which of the terminating stations serviced by the gateway require the calling party to incur a surcharge.

If the gateway determines that the terminating station is associated with a calling-party-pays account, the gateway determines whether the account associated with the calling line number is pre-approved to receive the surcharge. For instance, the gateway may determine whether the calling line number is associated with a pay phone, motel phone, or prison phone that is ineligible to receive the surcharge. In this manner, the gateway ensures that a call will not complete from a calling line number that cannot accept the surcharge.

If the gateway determines that the account associated with the calling line number is eligible to receive the surcharge, the gateway then determines whether the service provider has a billing relationship with the account associated with the calling line number. The gateway may identify the service provider by querying a Local Exchange Routing Guide (LERG) database and/or a Local Number Portability (LNP) database. Once the gateway has identified the service provider, the gateway determines whether a cross-billing relationship exists with the service provider. In this manner, the gateway ensures that it will complete calls to a calling-party-pays terminating station only if the originating service provider has a billing relationship with the owner of the gateway.

If such a cross-billing relationship exists, the gateway plays an announcement prompting the operator of the originating station to accept the surcharge. A positive response to this prompt authorizes the gateway to bill the surcharge to the account associated with the calling line number. The gateway then receives input from the operator of the originating station, such as a voice or touch-tone response to the prompt. If the gateway receives input from the operator authorizing the surcharge, the gateway creates an accounting record in a call detail record database billing the surcharge to the account associated with the calling line number and routes the communication to the terminating station.

In a voice-channel alternative, the originating station routes a voice-channel communication to the terminating switch. Because the gateway is located between the telephone network and the switch servicing the terminating station, the gateway intercepts the voice-channel communication before it reaches the terminating switch. Once the gateway receives the communication, it determines whether the calling-party-pays service should be applied to the call and, if so, whether a charge can properly be made. The gateway plays announcements to the operator and directly receives input from the operator. If the gateway determines that the calling-party-pays service can be applied to the call, the gateway routes the voice-channel communication to the terminating switch and creates an accounting record for the call.

Alternatively, the gateway may perform its functions in response to a signaling-channel message. In this case, the originating switch holds the incoming telephone call and sends a signaling message to the terminating switch. Due to its position between the telephone system and the terminating switch, the gateway receives this signaling message. In response to the signaling message, the gateway determines whether the calling-party-pays service should be applied to the call and, if so, whether a charge can properly be made. If an announcement must be played to the operator or input received, the gateway sends a signaling-channel message to the originating switch instructing it to route the call to a service circuit node. The service circuit node plays the announcements, receives input from the operator, and sends the information to the gateway. The gateway then determines if the calling-party-pays service can be applied to the call. If the calling-party-pays service can be applied to the call, the gateway sends a signaling message to the service circuit node instructing it to route a voice-channel communication from the originating station to the terminating station. The gateway then creates an accounting record for the call. In this manner, the gateway initiates a voice-channel communication only after it has determined that the call can be completed.

That the present invention improves over the drawbacks of the prior art and accomplishes the objects of the invention will become apparent from the detailed description of the preferred embodiment to follow.

BRIEF DESCRIPTION OF THE DRAWINGS

FIG. 2a is a functional block diagram of an intelligent switched telecommunications network for implementing a voice-channel embodiment of the invention.

FIG. 2b is a functional block diagram of an intelligent switched telecommunications network for implementing a signaling-channel embodiment of the present invention.

FIG. 3 is a functional block diagram illustrating databases used to provide calling-party-pays services.

FIG. 5b is a logic flow diagram illustrating a method for receiving a communication connection request directed to a terminating station in connection with a signaling-channel embodiment of the invention.

DETAILED DESCRIPTION OF EXEMPLARY EMBODIMENTS

Figure 1:
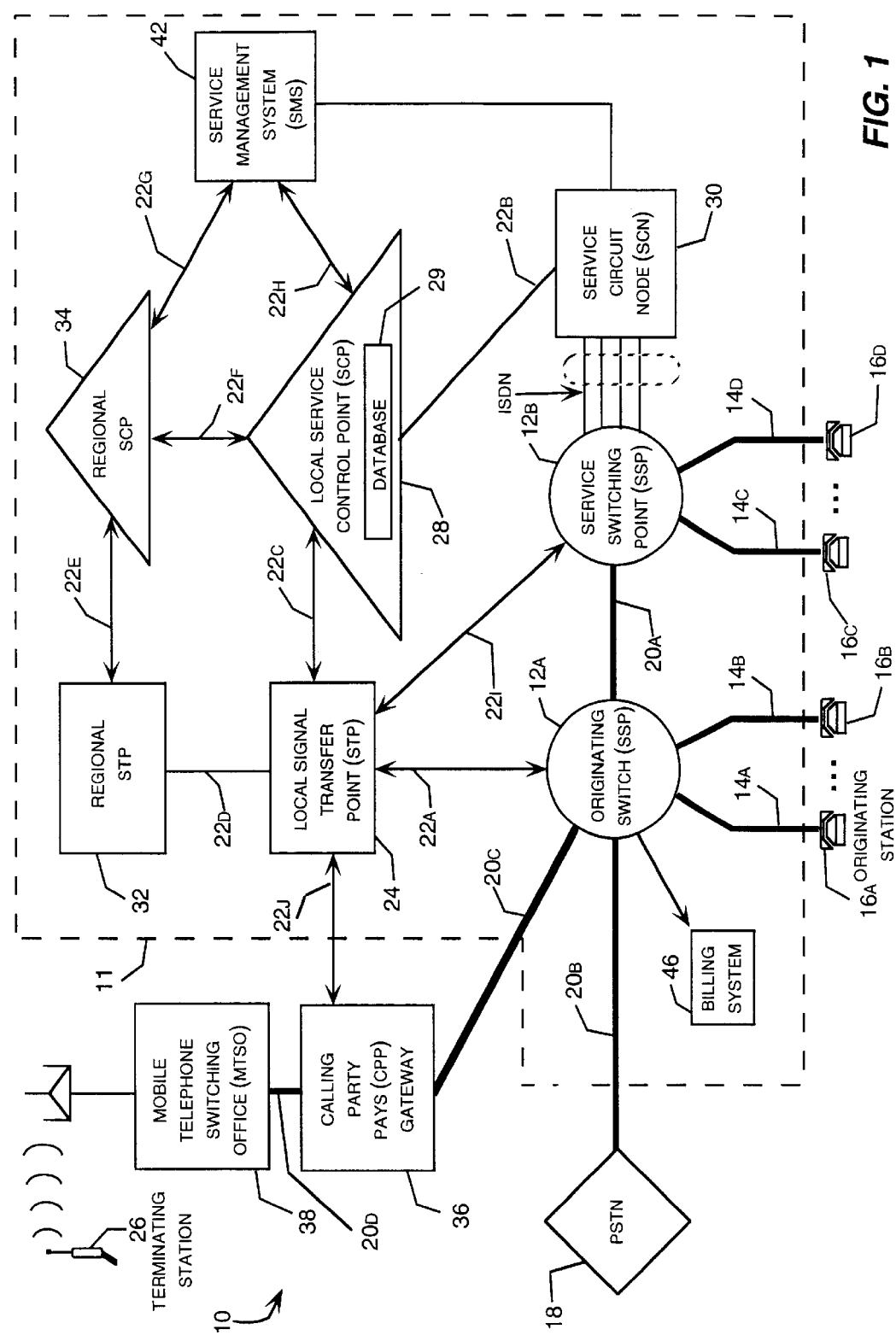
FIG. 1 is a functional block diagram of an intelligent switched telecommunications network configured to implement calling-party-pays services in accordance with an exemplary embodiment of the present invention.

The invention may be embodied in a gateway for implementing calling-party-pays telecommunication services. The gateway is functionally connected between the public switched telephone network (PSTN) and one or more switches servicing a plurality of terminating stations. The gateway intercepts all communications directed to terminating stations serviced by the switches and, if necessary, applies the calling-party-pays service to the communications. While the gateway is described as a stand-alone apparatus, those skilled in the art will appreciate that the functionality of the gateway may be physically incorporated into another device, such as a switch or an adjunct processor to the switch or other network element. The description of the gateway is presented here in two distinct embodiments, a voice-channel embodiment and a signaling-channel embodiment.

In the voice-channel embodiment, the gateway intercepts a voice-channel communication directed to a terminating switch. Because the gateway controls the voice-channel communication, it can directly play announcements to the operator of the originating station and receive input from the operator without any assistance from a LEC. Therefore, the voice-channel embodiment allows a wireless carrier or other service provider to implement the calling-party-pays service without any modification to the LEC's network infrastructure.

In the voice-channel embodiment, an originating switch receives a communication connection request from an originating station directed to a terminating station serviced by the gateway. The originating switch is places the communication on hold and determines instructions for routing the communication to the terminating station. For example, the originating switch may query a local number portability (LNP) database and/or a local exchange routing guide (LERG) database for these routing instructions. The originating switch is typically the switch directly servicing the originating station but may be another switch within the system. In the case of a long-distance telephone call, for instance, the originating switch may be the first switch within the local exchange carrier (LEC) connected to the gateway servicing the terminating station.

Once the originating switch receives the routing instructions, it routes a voice-channel communication from the originating station to the appropriate terminating station. The gateway intercepts the voice-channel communication and takes over the processing of the call. The gateway determines whether the calling-party-pays service should be applied to the communication and, if so, it determines whether the surcharge for the call can be billed to an account associated with the calling line number. Specifically, the gateway queries a subscriber database to determine if the account associated with the terminating station is a calling-party-pays account. The subscriber database may be maintained within the gateway or external to the gateway, for example in a clearinghouse accessible by a number of gateways. If the account is not a calling-party-pays account, the gateway transfers the voice-channel communication directly to the switch servicing the terminating station without application of the calling-party-pays service.

If the gateway determines that the account associated with the terminating station is a calling-party-pays account, the gateway then determines whether the account associated with the calling line number is pre-approved to receive the calling-party-pays surcharge. Specifically, the gateway first determines whether the calling line number is eligible to receive a surcharge. Certain types of telephones, such as payphones, hotel/motel phones, or prison phones, are ineligible to receive such a surcharge. Therefore, if the gateway determines that the calling line number is associated with one of these types of phones, the calling line number is ineligible to receive the surcharge. If, however, the gateway determines that the calling line number is eligible to receive a surcharge, the gateway then determines whether a cross-billing arrangement exists with the originating service provider.

A "cross-billing arrangement" means a business arrangement between the owner, operator, or representative of the gateway and a service provider by which the service provider bills its subscribers for calls completed to calling-party-pays subscribers and shares a portion of the fees with the owner, operator, or representative of the gateway. To determine if a cross-billing relationship exists, the gateway first determines the identity of the originating service provider by looking up the calling line number in a LNP database or a LERG database. Once the gateway has determined the identity of the originating service provider, it then queries a service provider database to determine if a cross-billing arrangement exists with the originating service provider. The gateway may maintain the service provider database, or the database may be maintained external to the gateway, for example in a clearinghouse. If a cross-billing arrangement exists, the communication is typically pre-approved to receive surcharge. If a cross-billing arrangement does not exist, the communication is typically not pre-approved.

Those skilled in the art will appreciate that the gateway may take additional steps to determine whether the calling line account is pre-approved for the surcharge. For example, the gateway may consult a database maintained by the originating service provider containing a service profile for the calling line account. This service profile may indicate whether the calling line account is pre-approved to accept surcharges. Alternatively, the gateway may consult a clearinghouse that indicates the pre-approved status of various accounts. Many other automatic account verification techniques will be apparent to those skilled in the art.

If the communication is pre-approved to receive the surcharge, the gateway plays an announcement to the operator of the originating station indicating that the account will be charged and prompting the operator for authorization to proceed. The gateway then receives input from the operator of the originating station. If the operator provides input authorizing the surcharge, the gateway routes the voice-channel communication to the switch servicing the terminating station and creates an accounting record for the call in a call detail database. The gateway later passes the accounting records to the appropriate billing system so that an invoice can be created and payment received for the call.

If the communication is not pre-approved to receive the surcharge, the gateway attempts to obtain authorization to bill the surcharge to an alternate account, such as a credit card, prepaid telephone card, an account associated with an alternate telephone number (e.g., the calling party's home telephone), or the like. Specifically, the gateway plays an announcement to the operator of the originating station indicating that the calling line number is ineligible to receive the surcharge and requests an alternate payment method. The gateway then accepts touch-tone or voice input from the operator authorizing the use of an alternate payment method. If the operator authorizes an alternate payment method, the gateway accepts billing information from the operator. If the billing information is valid, the gateway routes the voice-channel communication to the switch servicing the terminating station and creates an accounting record for the call. If the operator of the originating station does not authorize an alternate payment method, the gateway plays an appropriate announcement and disconnects the call.

In the signaling-channel embodiment, an originating switch receives a communication connection request from an originating station directed to a terminating station served by the gateway. The originating switch places the communication on hold and queries an LNP or LERG database to determine routing instructions for the call. Once the originating switch has received the routing instructions, it queries the gateway to determine if the terminating station is off hook. The gateway determines whether the terminating station is off hook and, if the terminating station is off hook, the gateway sends a signaling-channel message instructing the originating switch to play a busy signal audible to the operator of the originating station. If the terminating station is not off hook, the gateway takes over the processing of the call.

As in the voice-channel embodiment, once the gateway takes over processing of the call, it first determines whether the terminating station is associated with a calling-party-pays account. If the terminating station is not calling-party-pays, the gateway sends a signaling-channel message instructing the originating switch to route the communication through the switch servicing the terminating station and, ultimately, to the terminating station.

If the terminating station is calling-party-pays, the gateway determines whether the account associated with the calling line number is eligible and pre-approved to receive a surcharge as described above with respect to the voice-channel embodiment. If the calling line number is eligible to receive the surcharge, the gateway instructs the originating switch to transfer the communication to a service circuit node (SCN), and provides instructions to the SCN to play the announcement and to receive input from the operator of the originating station. If the SCN receives authorization to bill the surcharge, it sends the communication back to the originating switch. The originating switch then sends a signaling-channel message back to the gateway indicating that operator has authorized the surcharge. The gateway then instructs the originating switch to transfer a voice-channel communication to the gateway. When the gateway receives the communication, it routes the communication to the switch servicing the terminating station and creates an accounting record for the call. By communicating with the originating switch and the SCN via signaling messages, the gateway saves valuable voice trunk capacity by ensuring that a voice-channel communication is not routed until the operator has authorized the surcharge.

Referring now to the drawings, in which like numerals indicate like elements throughout the several figures, exemplary embodiments of the invention will be described below with reference to the appended drawings. FIG. 1 illustrates an intelligent switched telecommunications network, which is the preferred operating environment of the invention. FIGS. 2a and 2b illustrate a portion of an intelligent switched telecommunications network configured for local number portability. FIG. 3 illustrates the databases utilized by the exemplary embodiments of the invention. The remaining figures, FIGS. 4–8b, are logic flow diagrams that illustrate methods for implementing the exemplary embodiments of the present invention.

Preferred Operating Environment

FIG. 1 is a functional block diagram of an intelligent switched telecommunications network for use in connection with the exemplary embodiments of the present invention. FIG. 1 illustrates a portion of a public switched telecommunications network (PSTN) 18 including an Advanced Intelligent Network (AIN) 11 of a typical local exchange carrier (LEC). The AIN 11, which is well known to those skilled in the art, is the operating environment of the preferred embodiments of the present invention. The AIN is described in the commonly owned patent to Weisser, Jr., U.S. Pat. No. 5,438,568, which is incorporated by reference.

The AIN 11 includes a plurality of central office switches with some of the central office switches equipped with service switching points (SSPs). A representative SSP is shown as an originating switch, SSP 12a, in FIG. 1. An SSP (specifically, a Class 5 central office switch) is the AIN component of a typical electronic central office switch used by a local exchange carrier. The terms "SSP" and "switch" are used interchangeably to refer to a telecommunications switch for connecting voice channel circuits, including voice channel lines, commonly designated as 14. The SSP 12a is preferably equipped with AIN software release 0.1 or higher release.

Each SSP in the AIN 11 "services," or serves as an originating switch for a number of subscriber lines. An originating switch is typically directly connected with the subscriber lines serviced by the switch. Thus, the originating switch that services a subscriber's line is usually the first network element of the AIN 11 to process communications originating on the subscriber's line. The originating switch receives a communication originating on the subscriber line and implements further processing, such as routing the communication for connection with a terminating station. For example, the SSP 12a may receive a communication from an originating station 16a on the subscriber line 14a and route the communication for connection with a terminating station 16c in accordance with the packet-switched protocol of the PSTN 18. The details of communication routing are familiar to those skilled in the art and will not be further described herein.

The switches of the AIN 11 are interconnected by a network of voice channel lines known as "trunks" commonly designated as 20 in FIG. 1. Trunks are the voice channel circuits that interconnect the central office switches to connect voice-channel communications. The term "communication" includes all messages or communications that may be exchanged between two pieces of terminating equipment. In FIG. 1, the terminating equipment is represented by telephones that are commonly designated as 16. Although telephones are illustrated as the pieces of terminating equipment, those skilled in the art will understand that terminating equipment may include other communication devices, such as wireless telephone 26, facsimile machines, computers, modems, etc.

Each piece of terminating equipment in the PSTN 18 is preferably assigned a directory number. The term "directory number" is used herein in a manner consistent with its generally understood meaning of a number that is dialed or input by an originating party at an originating station to reach a terminating station associated with the directory number. A directory number, typically a seven or ten-digit number is commonly referred to as a "telephone number" and may be assigned to a specific telephone line, such as the telephone line 14c shown in FIG. 1.

It should also be noted that FIG. 1 illustrates a conventional landline telecommunications system, in which each subscriber is associated with a unique subscriber line, such as the subscriber line 14a. For simplicity, the exemplary embodiments of the present invention are described in the context of the conventional landline telecommunications system illustrated by FIG. 1. It should be understood, however, that alternative embodiments of the present invention might operate in association with cellular or other wireless telecommunications systems.

In the following description of the exemplary embodiments, a communication is routed from an originating station 16a to a terminating station 26. Routing the communication from the originating station 16a to the terminating station 26 involves the selection of a routing path for the communication and may also involve the implementation of one or more advanced network functions, such as call forwarding, calling party identification, prepaid or debit-card communication services, and the like. In fact, a wide variety of advanced network functions are presently available though the AIN 11. The ability of a typical SSP to provide these advanced network functions, however, is limited due to physical and other constraints. The AIN 11 therefore provides for increased information processing capability through a system of intelligent network elements that are functionally connected with the SSPs through a network of data links that are commonly designated as 22 in FIG. 1.

These intelligent network elements of the AIN 11 can communicate with each other, and with the SSPs of the network, via digital data messages transmitted over the network of digital data links 22. An SSP may be configured to interface with these intelligent network elements through the use of a "trigger." In general, a trigger serves as an indicator for the SSP to take certain action. The SSP is configured so that, when the SSP detects a predetermined set of conditions defining the trigger in association with a communication, the SSP creates an appropriate digital data message for transmission over the network of digital data links 22. The SSP may also suspend routing of the communication (i.e., hold the communication) until the SSP receives a reply to its message from an appropriate network element via the network of digital data links 22 instructing the SSP to take a certain action. If the SSP receives no instructions within a certain amount of time, the SSP "times-out" and executes a default task for the communication.

The message created by an SSP in response to a trigger is known as a "query" message. A query message opens a "transaction" and the SSP generally holds the communication while the transaction remains open. The reply to the query message may be a "conversation" message or a "response" message. Conversation messages allow for bi-directional exchanges between network elements while the transaction remains open. A "response" message closes the transaction opened by the query message, and usually instructs the SSP to route the held communication for connection with a terminating station. A trigger is typically activated or deactivated at an SSP by another network element through an "update" message. Query messages, conversation messages, response messages, and update messages are standard types of messages defined by the AIN protocol. The details of the AIN protocol are well known to those skilled in the art.

For the exemplary embodiments of the present invention, the originating switch 12a is preferably an SSP. It is noted, however, that the AIN 11 may also include non-SSP central office switches (not shown). It will be appreciated that a non-SSP switch may initially receive a communication on a subscriber line and pass the communication to another switch, such as the SSP 12a, for further processing. Similarly, in a cellular or wireless network, a mobile switching office or other receiver/transmitter may initially receive a communication from a cellular telephone or wireless unit and route the communication to another network element, such as the SSP 12a, for further processing. In this manner, advanced network functions available through the AIN 11 may be provided to wireless units and to subscriber lines that are directly connected to non-SSP switches.

Each switch in the AIN 11 is connected to a local signal transfer point (STP) via a data link. This arrangement is represented in FIG. 1 by the originating switch 12a, which is connected to the STP 24 by a data link 22a. The STP 24 is a multi-port, high-speed packet switch that is programmed to respond to the routing information in the SS7 protocol, and route the packet to its destination.

Much of the intelligence of the AIN 11 resides in a plurality of local service control points (SCPs), represented by an SCP 28, which is connected to the STP 24 by an SS7 data link 22c. An SCP, such as the SCP 28, is a remotely programmable intelligent network element. The SCP 28 is preferably equipped with AIN software release 0.1 or higher release. As is known to those skilled in the art, SCPs are physically implemented by relatively powerful fault tolerant computers. Among the functions performed by SCPs is the maintenance of network databases, such as database 29 that are used in providing subscribers with advanced network functions.

Additional devices for implementing advanced network functions within the AIN 11 are provided by a regional STP 32, a regional SCP 34, and a service management system (SMS) 42. Both the regional SCP 34 and the local SCP 28, which represents a plurality of local SCPs distributed throughout the AIN 11, are connected via respective data links 22g and 22h to the SMS 42. The SMS 42 provides a centralized platform for remotely programming the various SCPs of the AIN 11 so that a coordinated information-processing scheme may be implemented for the AIN 11. The SMS 42 is implemented by a large general-purpose computer and interfaces to business offices of the local exchange carrier and inter-exchange carriers. The SMS 42 downloads information to the databases of SCPs 28 and 34 when subscribers set up or modify their ensemble of AIN services. Similarly, the SMS 42 downloads, on a non-real-time basis, billing information to a billing system 46 that is needed in order to appropriately invoice subscribers for the services provided.

As illustrated in FIG. 1, the AIN 11 also includes a service circuit node 30 (SCN), which may also be referred to as a service node (SN).

The SCN 30 includes voice and dual tone multi-frequency (DTMF) signal recognition devices and voice synthesis devices. The SCN 30 communicates with the local SCP 28 via data link 22b using an X.25 protocol or via non-call associated signaling, and to the SMS 42 via a data link. In addition, the SCN 30 typically is connected to one or more (but usually only a few) SSPs via Integrated Service Digital Network (ISDN) links, as shown by the connection to the SSP 12b. A more extensive description of non-call associated signaling is provided in Koster, U.S. Pat. No. 5,499,290, which is expressly incorporated by reference.

The AIN 11 thus provides subscribers with a selectable menu of advanced network functions. These advanced network functions are typically sold on a per-service basis, or in groups of services known as calling plans. Each subscriber may select a set of advanced network functions, or a calling plan that suits the subscriber's needs. Moreover, each subscriber may generally select among a plurality of local advanced network functions as well as select among a plurality of long distance advanced network functions. The subscriber's local exchange carrier is generally responsible for maintaining accounting records for both local and long distance services, and producing unified billing statements for individual subscribers.

The billing system 46 produces these billing statements. Information may be downloaded from the SMS 42 to the billing system 46, and vice versa, in association with the preparation of the billing statements. The operation of a billing system of a telecommunications service provider, such as the billing system 46, is well known to those skilled in the art and will not be further described herein.

It will be appreciated that the billing system 46 generally requires accounting records for each subscriber on a per-communication basis. These per-communication accounting records for a particular subscriber are typically created, in a manner well known to those skilled in the art, by the originating switch that services the subscriber's line. For example, the SSP 12a creates per-communication accounting records for communications originating on the subscriber line 14a. Each of these accounting records preferably includes the subscriber's directory number, the terminating station directory number, and the duration of the connection between the originating station on the subscriber line and a terminating station. The per-communication accounting records created by the SSP 12a for the subscriber line 14a are periodically downloaded to the billing system 46 on a non-real-time basis. The billing system 46 computes the costs for the communications represented by the various accounting records and prepares billing statements to be mailed to the subscriber. Per-communication accounting records may also be initiated by another service provider, such as a wireless provider, and processed by the billing system 46.

FIG. 1 also shows a calling-party-pays (CPP) gateway 36 connected to the SSP 12a via a voice channel line 20c and to the STP 24 via a data link 22j. The CPP gateway 36 is connected to one or more switches, represented by the mobile telephone switching office (MTSO) 38, by one or more voice-channel lines, represented by the voice-channel line 20d. The MTSO 38 provides mobile telecommunication services to a group of terminating stations, represented by terminating station 26. The operation of the CPP gateway 36 is described below with reference to FIGS. 2a–8b.

It should be noted that the preferred operating environment of the present invention is not limited to the relatively simple configuration shown in FIG. 1. Rather, FIG. 1 shows an illustrative portion of the PSTN 18 sufficient to describe the exemplary embodiments of the invention. Many other network elements and interconnections, including SSP, non-SSP, and MTSO switches for servicing other the pieces of terminating equipment, are not shown in FIG. 1, but will be understood to be appropriate for use with the present invention.

Description of a Voice-channel Embodiment

FIG. 2a illustrates a voice-channel embodiment for billing a surcharge associated with a telecommunication service to an account associated with a calling line number. As used in this specification, the phrase "an account associated with a calling line number" means any account used by the calling party to receive telephone charges. For example, the account may be the calling party's telephone service account, an account specified by the calling party, such as a credit card number, or an alternate telephone number specified by the calling party to which charges can be made. Those skilled in the art will appreciate that many other types of payment methods can be used in connection with the present invention.

Referring now to FIG. 2a, the originating service provider 44 includes an originating switch 12a. The originating switch 12a serves a plurality of originating stations, such as the originating station 16a, which are functionally connected to originating switch 12a by subscriber lines, such as subscriber line 14a. As discussed above, a subscriber line such as line 14a is associated with a directory number. Throughout this specification, a directory number is referred to as a "calling line number" when the associated originating station is used to initiate a telephone call.

The originating switch 12a is functionally connected to the billing system 45, which, among other things, associates the billing account 17a with a directory number. For instance, the billing system 45 associates the subscriber line 14a with the billing account 17a. In this manner, charges may be posted to the billing account 17a and a bill for the charges can be provided to the subscriber.

The originating switch 12a is also connected to the Local Number Portability (LNP) Database 58 and the Local Exchange Routing Guide (LERG) Database 60. The originating switch 12a consults these databases to determine if a terminating station has "ported" and to determine instructions for routing the call to the terminating station.

The voice channel line 20k connects the originating service provider 44 to inter-exchange carrier 47. The inter-exchange carrier 47 provides long distance services to the originating service provider 44. In this manner, the inter-exchange carrier 47 connects the originating service provider 44 to the local exchange carrier (LEC) 48. The voice channel line 20b connects the inter-exchange carrier 47 to LEC 48. Note that for purposes of the present invention, the originating service provider 44 may be located anywhere in the PSTN 18 and may be connected to the LEC 48 through means other than the inter-exchange carrier 47.

The LEC 48 is connected to a switch, such as the mobile telephone switching office (MTSO) 38, through the CPP gateway 36. In the voice-channel embodiment, the LEC 48 is connected to the CPP gateway 36 through the voice channel line 20c. In this manner, all communications directed to terminating stations serviced by the MTSO 38 are delivered to the CPP gateway 36 through the voice channel line 20c.

The CPP gateway 36 is functionally connected to the LNP database 58' and the LERG database 60'. The CPP gateway 36 maintains a call detail database 52, a subscriber database 54, and a network provider database 56. As described below, the CPP gateway 36 uses these databases to determine (a) if a surcharge is to be charged to an account associated with a calling line number, (b) whether the charge can properly be made, and, (c) if the charge can properly be made, to hold an accounting record for the charge.

To illustrate how the CPP gateway 36 provides calling-party-pays services in a voice-channel embodiment, consider a telephone call placed from the originating station 16 to a wireless terminating station 26, which is a calling-party-pays terminating station. The operator of the originating station 16 places a telephone call directed to the terminating station 26. The originating switch 12a receives the call setup request from the originating station 26 and places the call on hold. The originating switch 26 then analyzes the dialed directory number and queries the LNP database 58' to determine if the terminating station 26 has "ported." In response to the query, the LNP database 58' provides routing instructions for the call to the originating switch 12a. The originating switch 12a uses the routing instructions to route a voice-channel communication from the originating station 16 to the MTSO 38. The originating switch 12a routes the voice-channel communication through the voice channel line 20k to the inter-exchange carrier 47 and through the voice channel line 20b to the LEC 48.

The CPP gateway 36 intercepts the voice-channel communication from the originating switch 12a before the communication reaches the MTSO 38. The CPP gateway 36 then determines whether the calling-party-pays service should be applied to the communication. That is, the CPP gateway 36 determines whether the terminating station 26 is associated with a calling-party-pays account. The procedure for making this determination is discussed below with regard to FIG. 4. If the CPP gateway 36 determines that the terminating station 26 is not associated with a calling-party-pays account, the CPP gateway 36 routes the voice-channel communication through the voice channel 20d and the MTSO 38 to the terminating station 26 without application of the calling-party-pays service.

If the CPP gateway 36 determines that the terminating station 26 is associated with a calling-party-pays account, the CPP gateway 36 determines whether the surcharge may be posted to the account 17a associated with the calling line number. The procedure for making this determination is discussed below with regard to FIGS. 4 and 6.

If the CPP gateway 36 determines that the surcharge may be posted to the account 17a associated with the calling line number, it then plays an announcement prompting the operator of the originating station 16 for authorization to bill the surcharge. The CPP gateway 36 then accepts voice or tone input from the operator authorizing or declining the surcharge. If the operator authorizes the surcharge, the CPP gateway 36 routes the voice-channel communication through the voice channel 20d and the MTSO 38 to the terminating station 26. The CPP gateway 36 also creates a database entry in the call detail database 52 indicating that the surcharge should be billed to the account 17a associated with the calling line number. If the operator declines the surcharge, the CPP gateway 36 plays a default announcement to the operator of the originating station 16 and disconnects the voice-channel communication.

If the CPP gateway 36 determines that the surcharge cannot be posted to the account 17a associated with the calling line number, the CPP gateway 36 attempts to obtain authorization from the operator of the originating station 16 to bill the surcharge to an alternate account, such as a credit card. The procedure for obtaining authorization to bill the surcharge to an alternate account is discussed below with respect to FIG. 7. During this procedure, the CPP gateway 36 may play announcements and receive input from the operator of the originating station 16, as described above. If the operator authorizes the CPP gateway 36 to bill the surcharge to an alternate account, the CPP gateway 36 routes the voice-channel communication through the voice channel 20d and the MTSO 38 to the terminating station 26. The CPP gateway 36 also creates a database entry in the call detail database 52 indicating that the surcharge should be billed to the alternate account. If the operator does not authorize the CPP gateway 36 to bill the surcharge to an alternate account, the CPP gateway 36 plays a default announcement to the operator of the originating station 16 and disconnects the voice-channel communication.

Description of a Signaling-channel Embodiment

FIG. 2b illustrates the signaling-channel embodiment of the present invention for billing a surcharge associated with a telecommunication service to an account associated with a calling line number. It should be appreciated that FIG. 2b is identical to FIG. 2a, except for the addition of signaling lines 22a and 22j, and signal transfer point (STP) 24.

Referring now to FIG. 2b, a telephone call placed from the originating station 16 to a wireless terminating station 26, which is a calling-party-pays terminating station, will be described to illustrate how the CPP gateway 36 provides calling-party-pays services in the signaling-channel embodiment. The operator of the originating station 16 places a telephone call directed to the terminating station 26. The originating switch 12a receives the call setup request from the originating station 26 and places the call on hold. The originating switch 26 then analyzes the dialed directory number and queries the LNP database 58' to determine if the terminating station 26 has "ported." In response to the query, the LNP database 58' provides routing instructions for the call to the originating switch 12a. The originating switch 12a uses the routing instructions to send a signaling-channel message to the MTSO 38. The originating switch 12a routes the signaling-channel communication through the signaling line 22a, STP 24, and signaling line 22j.

The CPP gateway 36 intercepts the signaling-channel communication from the originating switch 12a before the communication reaches the MTSO 38. The CPP gateway 36 then queries the MTSO 38 to determine if the terminating station 26 is off-hook. If the terminating station 26 is off-hook, the CPP gateway 36 sends a signaling channel message to the originating switch 12a instructing the originating switch 12a to play a busy signal to the operator of the originating station 16 and to disconnect the communication. The originating switch 12a then plays the busy signal and disconnects the call.

If the terminating station 26 is not off-hook, the CPP gateway 36 then determines whether the terminating station 26 is associated with a calling-party-pays account. If the CPP gateway 36 determines that the terminating station 26 is not associated with a calling-party-pays account, the CPP gateway 36 sends a signaling channel message to the originating switch 12a instructing the originating switch 12a to route a voice-channel communication through the voice channel 20d and the MTSO 38 to the terminating station 26. In this manner, the communication is passed through the CPP gateway 36 without application of the calling-party-pays service.

If the CPP gateway 36 determines that the terminating station 26 is associated with a calling-party-pays account, the CPP gateway 36 determines whether the surcharge may be posted to the account 17a associated with the calling line number. The procedure for making this determination is discussed below with regard to FIGS. 4 and 6.

If the CPP gateway 36 determines that the surcharge may be posted to the account 17a associated with the calling line number, it then sends a signaling channel message to the originating switch 12a instructing the switch to route a voice-channel communication from the originating station 16*a* to a service circuit node (SCN). The CPP gateway 36 also provides instructions to the SCN to play an announcement prompting the operator of the originating station 16*a* for authorization to bill the surcharge. The SCN then plays the announcement and accepts voice or tone input from the operator authorizing or declining the surcharge. The SCN sends a signaling channel message to the CPP gateway 36 indicating whether the operator authorized the surcharge.

If the operator authorizes the surcharge, the CPP gateway 36 sends a signaling channel message to the originating switch 12*a* instructing the switch to route the voice-channel communication through the voice channels 20*k*, 20*b*, 20*c*, and 20*d*, and the MTSO 38, to the terminating station 26. The CPP gateway 36 also creates a database entry in the call detail database 52 indicating that the surcharge should be billed to the account 17*a* associated with the calling line number. If the operator declines the surcharge, the CPP gateway 36 sends a signaling channel message to the SCN instructing it to play a default announcement to the operator of the originating station 16 and to disconnect the voice-channel communication.

If the CPP gateway 36 determines that the surcharge cannot be posted to the account 17*a* associated with the calling line number, the CPP gateway 36 attempts to obtain authorization from the operator of the originating station 16 to bill the surcharge to an alternate account, such as a credit card. The procedure for obtaining authorization to bill the surcharge to an alternate account is discussed below with respect to FIG. 7. During this procedure, the CPP gateway 36 may send signaling-channel messages to the SCN instructing it to play announcements and to receive input from the operator of the originating station 16, as described above. If the operator authorizes the CPP gateway 36 to bill the surcharge to an alternate account, the CPP gateway 36 sends a signaling-channel message to the originating switch 12*a* instructing it to route the voice-channel communication through the voice channels 20*k*, 20*b*, 20*c*, and 20*d*, and the MTSO 38 to the terminating station 26. The CPP gateway 36 also creates a database entry in the call detail database 52 indicating that the surcharge should be billed to the alternate account. If the operator does not authorize the CPP gateway 36 to bill the surcharge to an alternate account, the CPP gateway 36 instructs the SCN to play a default announcement to the operator of the originating station 16 and to disconnect the voice-channel communication.

Description of Databases

FIG. 3. illustrates the databases utilized in the exemplary embodiments of the present invention. Referring now to FIG. 3, the CPP Subscriber Database 54 contains an account number 86 for all calling-party-pays subscribers serviced by the CPP gateway 36. Typically, the account number 86 is the directory number associated with the account. For instance, the directory number of a calling-party-pays subscriber may be 404–555–1212. This same number may be used as the account number in the CPP Subscriber Database 54. In this manner, a single query of the CPP Subscriber Database 54 for the number of the terminating station will determine whether calls to the terminating station require a surcharge to be billed to an account associated with the calling line number. If the directory number of the terminating station is contained in the CPP Subscriber Database 54, the calling-party-pays service should be applied to the call. If the directory number of the terminating station is not contained in the CPP Subscriber Database 54, the calling-party-pays service should not be applied to the call.

The CPP Network Providers Database 56 contains the identities of all originating service providers 88 that have cross-billing relationships with the owner of the CPP gateway 36. A cross-billing relationship is a business arrangement whereby an originating service provider may bill its subscribers on behalf of the CPP gateway owner, operator, or representative, for calls made to calling-party-pays terminating stations serviced by the CPP gateway 36. The originating service provider may then share the revenue received from its subscriber with the owner, operator, or representative of the CPP gateway 36. Once CPP gateway 36 has identified the originating service provider, the CPP gateway 36 consults the CPP Network Provider Database 56 to determine whether a cross-billing relationship exists with the originating service provider.

The Local Number Portability (LNP) Database 58 cross-references individual "portable" directory numbers to the switches that serve the directory numbers. Specifically, the LNP Database 58 contains the directory number 70 of all "ported" directory numbers and a local routing number (LRN) 72 for each number. The LRN 72 identifies the local number to which calls to the "ported" directory number should be routed.

The Local Exchange Routing Guide (LERG) Database 60 contains information for each LRN 72 and central office code 82 identifying the switch 84 and service provider 85 serving the LRN or central office code. As described below, the LNP Database 58 and the LERG Database 60 are consulted to determine the identity of the originating service provider.

The Call Detail Record Database 52 contains data regarding calls that are completed to calling-party-pays terminating stations. Specifically, when a call has been routed to a calling-party-pays terminating station, the CPP gateway 36 records the time of call 74, the originating number 76, the terminating number 78, and the call duration 80 in the Call Detail Record Database 52. The originating service provider uses this information to bill a surcharge to the account associated with the calling line number.

Logic Flow Diagrams

Figure 4:
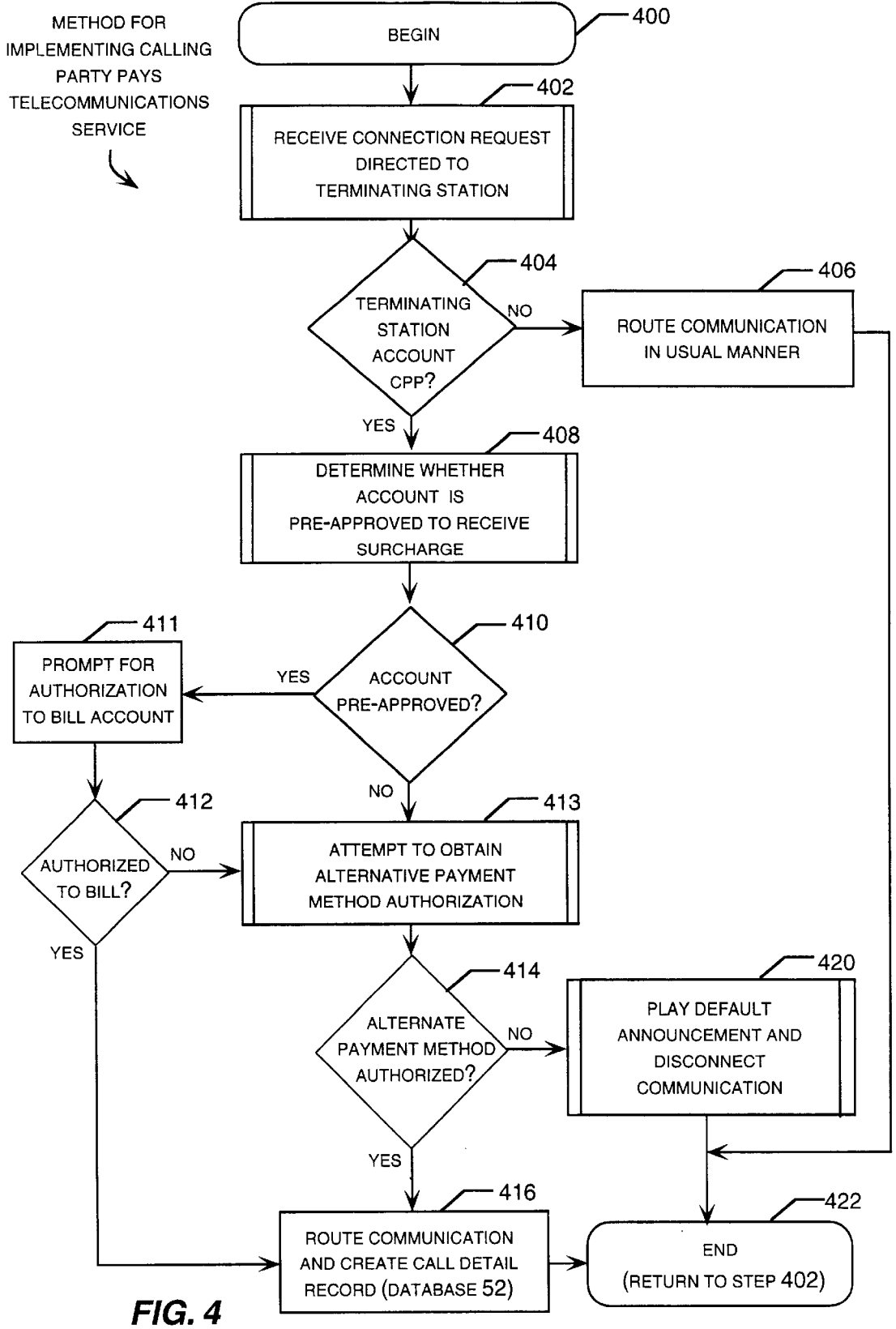
FIG. 4 is a logic flow diagram illustrating a method for billing a surcharge associated with a telecommunication service to an account associated with a calling line number.

FIG. 4 shows a method 400 for billing a surcharge associated with a telecommunication service to an account associated with a calling line number. In step 402, the CPP gateway 36 receives a connection request directed to a terminating station. The connection request may be either a voice-channel connection request or a signaling-channel connection request. For example, the connection request may be a telephone call from originating station 16 to terminating station 26, as shown in FIGS. 2*a*–*b*. Step 402 is described below with reference to FIGS. 5*a*–5*b*.

Once the CPP gateway 36 has received a connection request as described above, the method 400 continues at decision step 404 where the CPP gateway 36 determines whether the account associated with the terminating station 26 is a calling-party-pays account. That is, the CPP gateway 36 determines whether the terminating station 26 is associated with an account 86 that requires a surcharge to be billed to the account 17*a* associated with the calling line number. To make this determination, the CPP gateway 36 obtains the directory number associated with the terminating station 26. This number is located in the ISUP layer of SS7, specifically in the Initial Address Message (IAM). Methods for obtaining the directory number associated with the terminating station are well known to those skilled in the art.

Once the CPP gateway 36 has obtained the directory number associated with the terminating station 26, the CPP gateway 36 queries the CPP Subscriber Database 54 for the directory number associated with the terminating station 26. If the directory number associated with the terminating station 26 is not found in the CPP Subscriber Database 54, the account 86 associated with the terminating station is not a calling-party-pays account. Therefore, the method 400 continues at step 406 where the communication is routed in the usual manner. That is, the communication is routed transparently through the CPP gateway 36 without application of the calling-party-pays service. If, however, the directory number associated with the terminating station 26 is found in the CPP subscriber database 54, the account 86 associated with the terminating station 26 is a calling-party-pays account. The method 400 for billing a surcharge associated with a telecommunication service to an account associated with a calling line number continues at step 408.

Figure 6:
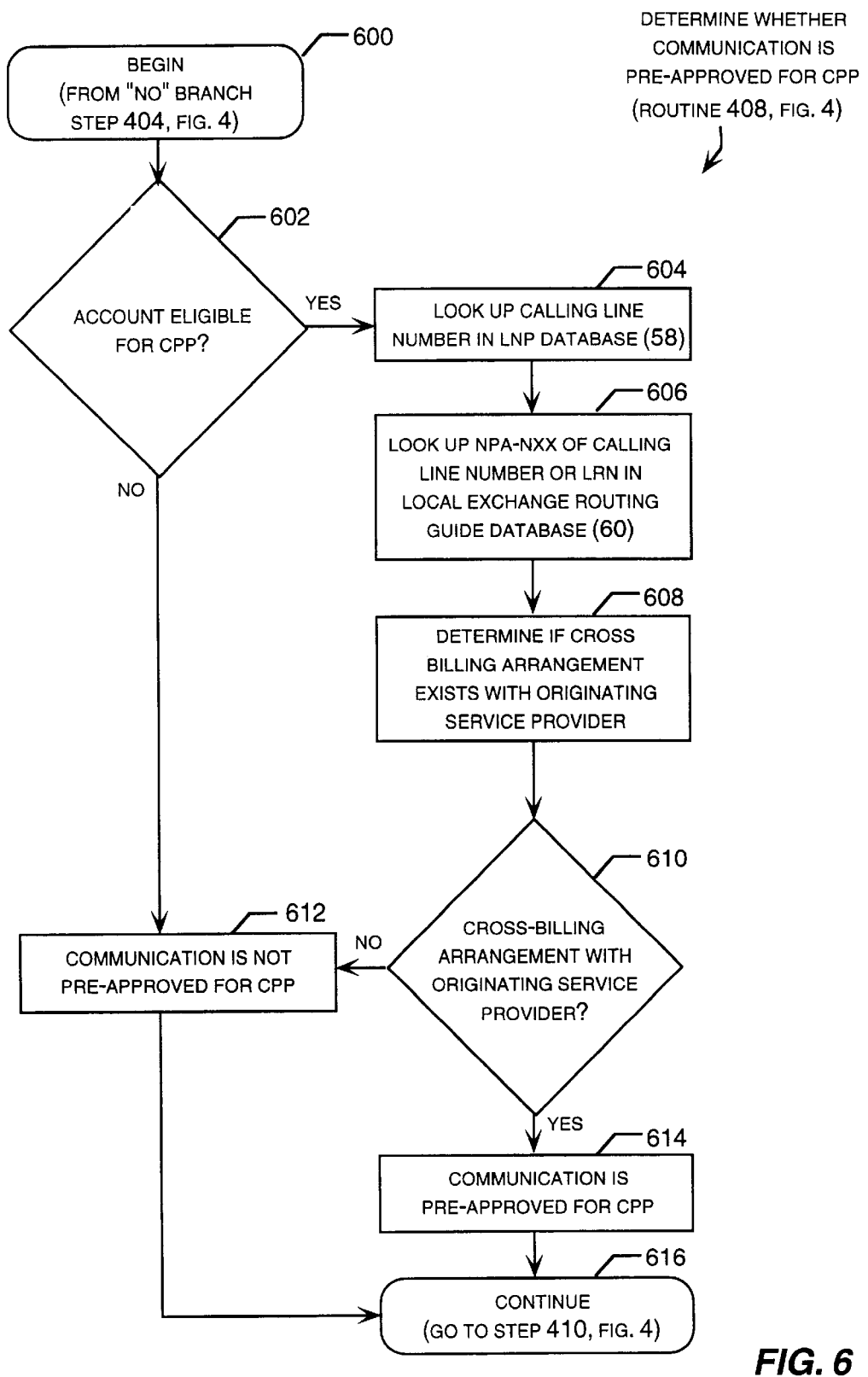
FIG. 6 is a logic flow diagram illustrating a method for determining whether an account associated with a communication is pre-approved to receive a calling-party-pays surcharge.

At step 408, the CPP gateway 36 determines whether the account 17a associated with the calling line number is pre-approved to receive a surcharge. An exemplary method for making this determination is illustrated in FIG. 6 and is discussed below. Step 408 is followed by step 410.

At decision step 410, the CPP gateway 36 determines whether the account 17a associated with the calling line number is pre-approved to receive a surcharge. If the account 17a associated with the calling line number is pre-approved to receive a surcharge, the "YES" branch is followed to step 411, in which an announcement is played that is audible at the originating station 16a. The CPP gateway 36 may play the announcement or, alternatively, the CPP gateway 36 may route the call to the SCN 30 which will then play the announcement. The announcement indicates to the operator of the originating station 16a that a surcharge must be billed to the account 17a associated with the calling line number for the communication to be connected to the terminating station 26. The announcement may also indicate that the operator of the originating station 16a should press a key on the telephone keypad or speak a voice command to accept or decline the surcharge. Either the CPP gateway 36 or the SCN 30 accepts the input from the operator.

Step 411 is followed by step 412, where the CPP gateway 36 determines whether the operator of the originating station 16a authorized a surcharge to the account 17a associated with the calling line number. If the operator of the originating station 16a authorized the surcharge, the "YES" branch is followed to step 416. At step 416, the CPP gateway 36 routes the communication to the terminating station 26 and creates a record in the Call Detail Record Database 52. If the operator of the originating station 16a did not authorize the surcharge, the "NO" branch is followed to step 413, where the CPP gateway 36 attempts to obtain authorization from the communication to bill the surcharge to an alternative payment method.

Referring again to step 410, if the CPP gateway 36 determines that the account 17a associated with the calling line number is not pre-approved to receive a surcharge, the "NO" branch is followed to step 413. At step 413, the CPP gateway 36 attempts to obtain authorization from the operator of the originating station 16a to bill the surcharge to an alternative payment method. Step 413 is described below with reference to FIG. 7.

Step 413 is followed by step 414 where the CPP gateway 36 determines whether the calling party has authorized billing the surcharge to an alternative payment method. If the operator has authorized billing the surcharge to an alternative payment method, the "YES" branch is followed to step 416 where the CPP gateway 36 routes the communication is routed to the terminating station 26 and creates a record in the Call Detail Record Database 52. If the operator has not authorized an alternative payment method, the "NO" branch is followed to step 420 where the CPP gateway 36 plays an appropriate announcement to the calling party and disconnects the communication. Step 420 is described below with reference to FIGS. 8a and 8b. The method 400 for implementing the calling-party-pays service ends at step 422.

Figure 5A:
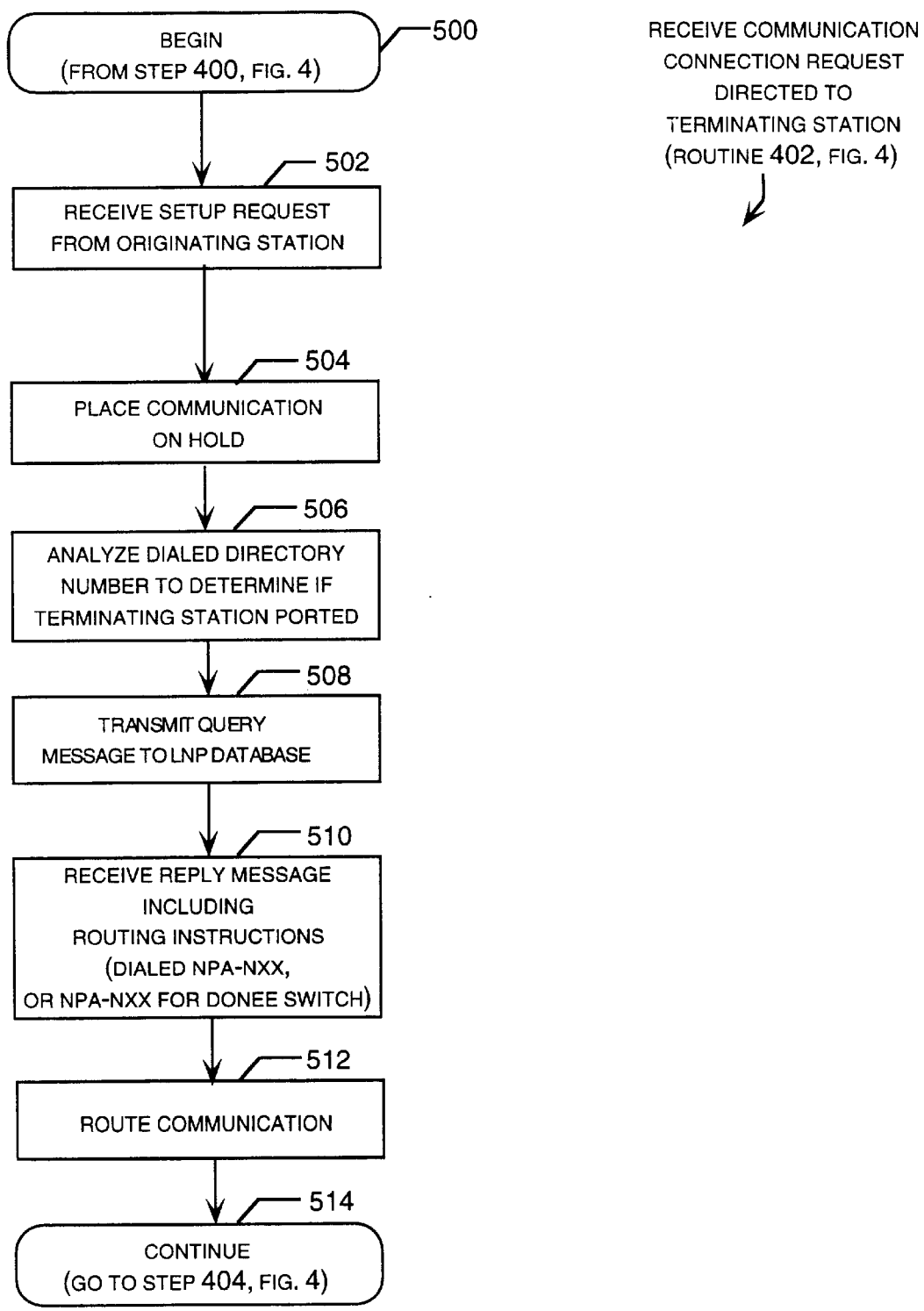
FIG. 5a is a logic flow diagram illustrating a method for receiving a communication connection request directed to a terminating station in connection with a voice-channel embodiment of the invention.

FIG. 5a illustrates the method 500 for receiving a voice-channel connection request directed to a terminating station 26. At step 502, the originating switch 12a receives a setup request from the originating station 16a. At step 504, the originating switch 12a places the voice-channel communication on hold determines routing instructions for the communication. At step 506, the originating switch 12a analyzes the dialed directory number of the terminating station 26 to determine if the terminating station 26 has "ported." To determine if the terminating station 26 has "ported," the originating switch 12a transmits a query to the LNP Database 60.

At step 510, the originating switch 12a receives a reply message from the LNP Database 60 including routing instructions for the communication. The routing instructions may include the dialed NPA-NXX or the NPA-NXX for the "recipient" switch if the terminating station 26 has "ported." At step 512, the originating switch 12a routes the voice-channel communication to the CPP gateway 36. Step 512 is followed by the "CONTINUE" step 514, which returns to step 404, shown in FIG. 4.

FIG. 5b illustrates the method 550 for receiving a signaling-channel connection request directed to a terminating station 26 in connection with the signaling-channel embodiment. At step 552, the originating switch 12a receives a call setup request from the originating station 16a. At step 554, the originating switch 12a places the voice-channel communication on hold and determines routing instructions for the communication. At step 556, the originating switch 12a analyzes the dialed directory number for the terminating station 26 to determine if the terminating station 26 has "ported," including transmitting a query to the LNP Database 60 to determine if the terminating station 26 has "ported." Once the originating switch receives routing instructions from the LNP Database 60, the originating switch 12a queries the CPP gateway 36 to determine if the terminating station 26 is off-hook, as shown at step 558.

Step 558 is followed by step 560, where the CPP gateway 36 determines whether the terminating station 26 is off-hook. If the terminating station 26 is off-hook, the "YES" branch is followed to step 562, where the CPP gateway 36 sends a signaling-channel message to the originating switch 12a instructing the originating switch 12a to provide a busy signal to the communication. Step 562 is followed by the "END" step 564, which returns to step 422 shown in FIG. 4. If the CPP gateway 36 determines at decision step 560 that the terminating station is not off-hook, the "NO" branch is followed from step 560 to the "CONTINUE" step 566, which returns to step 404 shown in FIG. 4.

FIG. 6 illustrates an exemplary method 600 for determining whether the calling line number is pre-approved to receive a surcharge. At step 602, the CPP gateway 36 determines whether the account 17a associated with the calling line number is eligible to receive a surcharge. To accomplish this, the CPP gateway 36 examines the connection request and, in particular, the ANI II digits located in the ISUP layer of the SS7 signaling message. The ANI II digits contain information relative to the nature of the originating station 16a. For instance, the ANI II digits may indicate that the originating station is a pay phone, a prison phone, or a hotel/motel phone. Calls from these types of originating stations are typically not pre-approved to receive a surcharge. Therefore, if the CPP gateway 36 determines that the ANI II digits are of the type that are not pre-approved for calling-party-pays, the "NO" branch is followed to step 612, in which a flag is set indicating that the communication is not pre-approved to receive a surcharge. If, however, the CPP gateway 36 determines that the ANI II digits indicate that the originating station 16a is eligible to receive a surcharge, the "YES" branch is followed to step 604.

At step 604, the CPP gateway 36 queries the LNP Database 58 using the calling line number. If the calling line number has "ported," the LNP Database 58 returns a Local Routing Number (LRN) for the calling line number to the CPP gateway 36. If the calling line number has not "ported," the LNP Database 58 returns a signal to the CPP gateway 36 indicating that the calling line number has not ported.

At step 606, the CPP gateway 36 queries the Local Exchange Routing Guide Database (LERG) 60. If the LNP Database 58 returned an LRN to the CPP gateway 36, the CPP gateway 36 queries the LERG using the LRN. If the LNP Database 58 did not return an LRN, the CPP gateway 36 queries the LERG using the NPA-NXX of the calling line number. For a given LRN or NPA-NXX, the LERG Database 60 returns the identity of the switch 84 associated with the LRN or NPA-NXX and the identity of the service provider 85 that owns the switch. In this manner, the CPP gateway 36 identifies the originating service provider 44.

At step 608, the CPP gateway 36 determines whether a cross-billing relationship exists with the originating service provider 44 by querying the CPP Network Providers Database 56 for the identity of the originating service provider 44. The CPP Network Providers Database 56 contains the identities of all service providers having a cross-billing relationship with the owner of the CPP gateway 36. Therefore, if the identity of the originating service provider 44 is contained in the CPP Network Providers Database 56, a cross-billing relationship exists with the originating service provider 44 and a surcharge may properly be billed to the account 17a associated with the calling line number.

At decision step 610, the CPP gateway 36 determines whether a cross-billing relationship exists with the originating service provider. If the CPP gateway 36 does not find the identity of the originating service provider 44 in the CPP Network Providers Database 56, there is no cross-billing relationship and the method continues at step 612. in this case, the "NO" branch is followed to step 612, where a flag is set indicating that the account associated with the calling line number is not pre-approved to receive a surcharge. If, however, the CPP gateway 36 locates the identity of the originating service provider 44 in the CPP Network Providers Database 56, the "YES" branch is followed to step 614, where a flag is set indicating that the account associated with the calling line number is pre-approved to receive a surcharge. Steps 612 and 614 are followed by the "CONTINUE" step 616, which returns to step 410 shown in FIG. 4.

Figure 7:
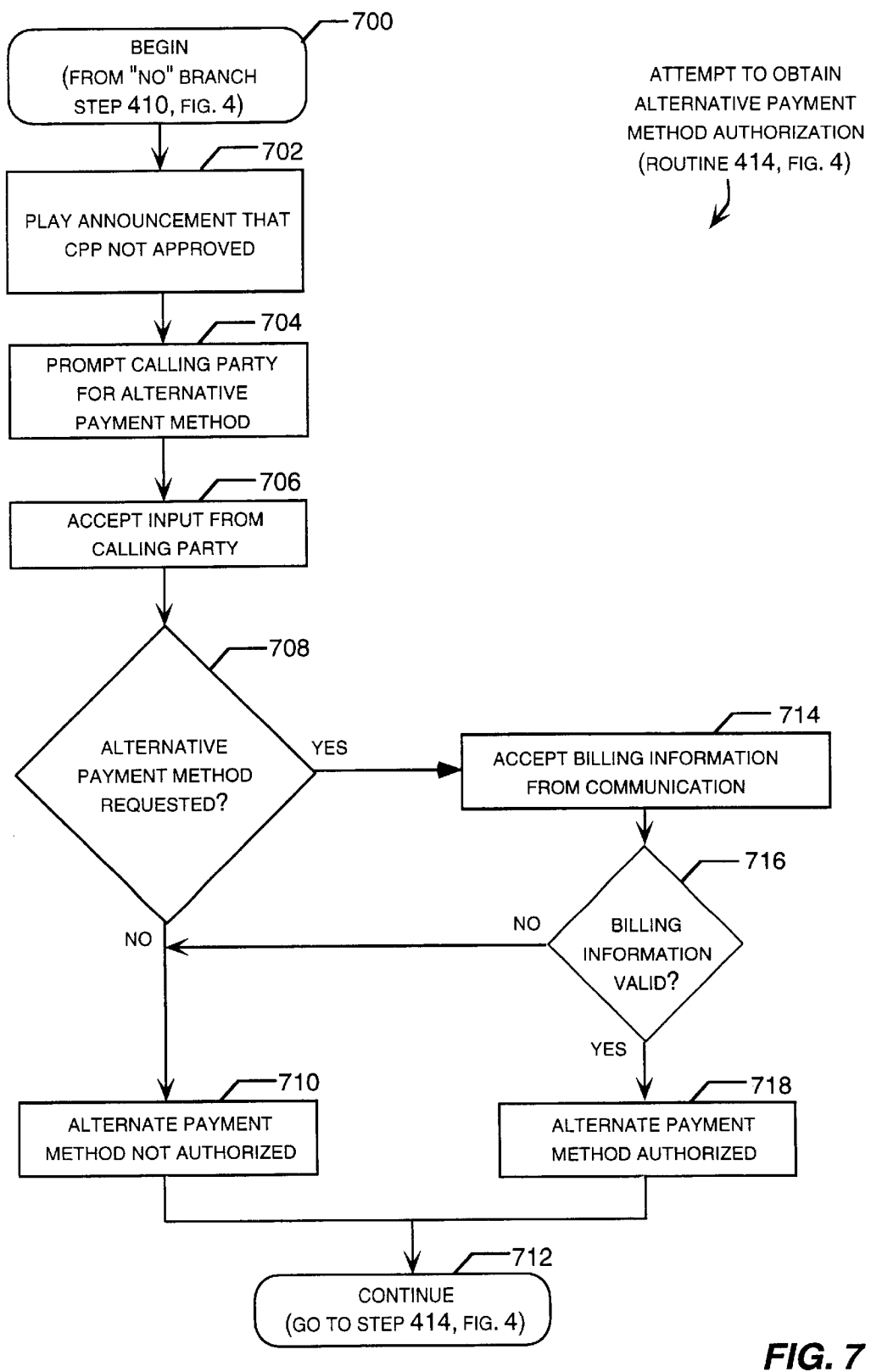
FIG. 7 is a logic flow diagram illustrating a method for obtaining authorization to bill a calling-party-pays surcharge to an alternative billing account.

FIG. 7 shows an exemplary method 700 for obtaining an alternative payment method authorization. At step 702, an announcement is played that is audible at the originating station 16a. The announcement indicates to the operator of the originating station 16a that a surcharge must be billed to the account 17a associated with the calling line number for the communication to be connected to the terminating station 26, but that the surcharge has not yet been approved. At step 704, either the CPP gateway 36 or the SCN 30 plays an announcement that is audible at the originating station 16a prompting the operator of the originating station 16a for an alternative payment method, such as a credit card or alternate telephone number. The announcement may also indicate that the operator of the originating station 16a should press a key on the telephone keypad or speak a voice command indicating that the operator desires to bill the surcharge to an alternate payment method. At step 706, input is accepted from the communication by the CPP gateway 36 or the SCN 30.

At step 708, the CPP gateway 36 determines whether the operator of the originating station 16a authorized the surcharge to be billed to an alternative payment method. If the calling party did not authorize an alternative payment method, the "NO" branch is followed to step 710, where a flag is set indicating that an alternate payment method is not authorized. If the operator of the originating station 16a authorized an alternative payment, the "YES" branch is followed to step 714, where either the CPP gateway 36 or the SCN 30 accepts billing information for the alternative payment method from the calling party. At step 716, the CPP gateway 36 or the SCN 30 determines whether the billing information is valid. If the billing information is not valid, the "NO" branch is followed to step 710, where a flag is set indicating that an alternate payment method is not authorized. If the billing information is valid, the "YES" branch is followed to step 718, where a flag is set indicating that an alternate payment method is authorized. Steps 710 and 718 are followed by the "CONTINUE" step 712, which returns to step 414 shown in FIG. 4.

Figure 8A:
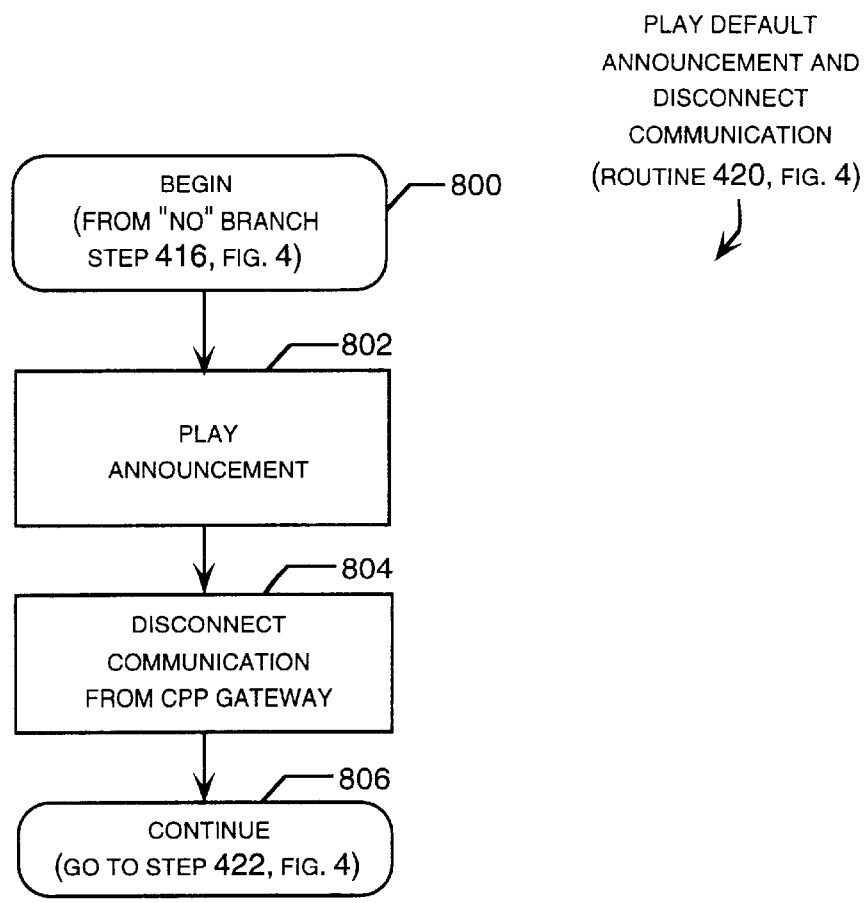
FIG. 8a is a logic flow diagram illustrating a method for playing a default announcement and disconnecting a communication in connection with a voice-channel embodiment of the invention.

FIG. 8a illustrates an exemplary method 800 for playing a default announcement and disconnecting the communication for the voice-channel embodiment of the invention. At step 802, the CPP gateway 36 plays an announcement that is audible by the operator of the originating station 26 indicating that the communication cannot be connected with the terminating station. At step 804, the CPP gateway disconnects the communication. Step 804 is followed by the "CONTINUE" step 806, which returns to step 422 shown on FIG. 4.

Figure 8B:
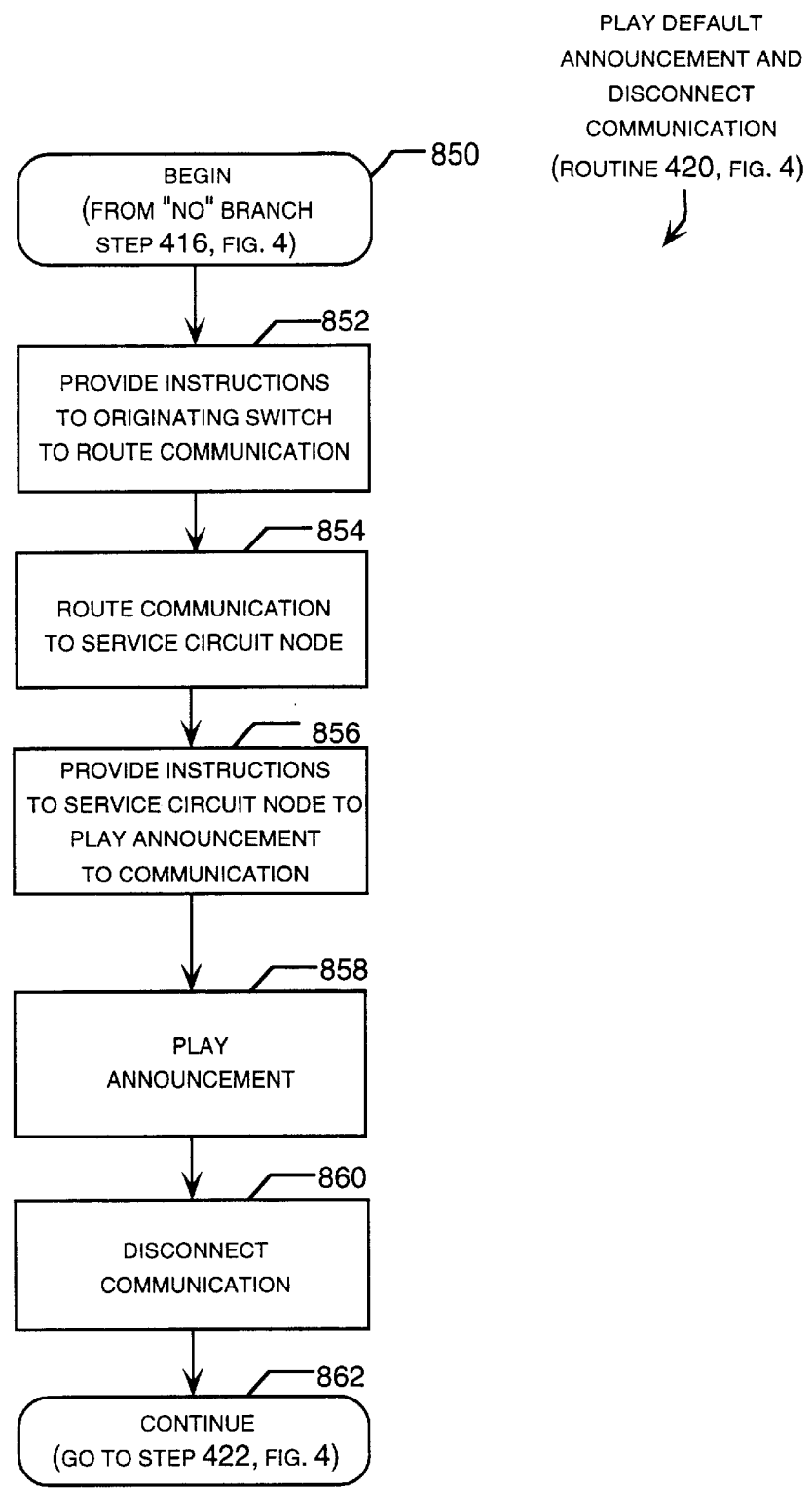
FIG. 8b is a logic flow diagram illustrating a method for playing a default announcement and disconnecting a communication in connection with a signaling-channel embodiment of the invention.

FIG. 8b illustrates method 850 for playing a default announcement and disconnecting the communication in connection with the second embodiment of the signaling-channel embodiment of the invention. At step 852, the CPP gateway 36 provides instructions to the originating switch 12a to route the communication to the service circuit node (SCN) 30. At step 854, the originating switch 12a routes the communication to the SCN 30. At step 856, the CPP gateway 36 provides instructions to the SCN 30 to play an announcement and to disconnect the communication. At step 858, the SCN 30 plays an announcement audible to the operator of the originating station 16a indicating that the communication is not approved for the calling-party-pays service and that the communication cannot be routed to the terminating station 26. At step 860 the SCN 30 disconnects the communication. Step 860 is followed by the "CONTINUE" step 863, which returns to step 422 shown on FIG. 4.

In view of the foregoing, it will be appreciated that the present invention provides a system and method for billing a surcharge associated with a telecommunication service to an account associated with a calling line number. It should be understood that the foregoing relates only to specific embodiments of the present invention, and that numerous changes may be made therein without departing from the spirit and scope of the invention as defined by the following claims.

What is claimed is:

1. In an intelligent switched telecommunications network, a method for billing a surcharge associated with a telecommunications service to an account associated with a calling line number, comprising:
   receiving a connection request from the originating station including a dialed directory number associated with the terminating station;
   based on the dialed directory number, querying a local number portability database to obtain routing instructions for connecting the communication from the originating station to a terminating station;
   using the routing instructions to route a voice channel for the communication from the originating station to a terminating switch;
   connecting the voice channel to a calling-party-pays gateway associated with the terminating switch;
   in response to the connection request, determining whether the terminating station is associated with an account that requires the surcharge to be billed to the account associated with the calling line number;
   if the terminating station is associated with an account that requires the surcharge to be billed to the account associated with the calling line number, determining whether the account associated with the calling line number is pre-approved to receive the surcharge;
   if the account associated with the calling line number is eligible to receive the surcharge, identifying a service provider having a billing relationship with the account associated with the calling line number by querying a local exchange routing guide database to identify the service provider having a billing relationship with the account associated with the calling line number;
   determining whether a cross-billing relationship exists with the service provider having the billing relationship with the account associated with the calling line number; and
   routing the communication to the terminating station.

2. The method of claim 1, wherein the step of routing the communication to the terminating station comprises:
   playing a prompt that is audible to an operator of the originating station;
   receiving input from the operator of the originating station indicating authorization to bill the surcharge to the account associated with the calling line number;
   creating an accounting record in a call detail record database billing the surcharge to the account associated with the calling line number; and
   routing the communication to the terminating station.

3. A computer storage medium storing a computer program which, when executed by a computer-controlled apparatus, causes the computer-controlled apparatus to perform the method of claim 1.

4. A computer-controlled apparatus operative for implementing the method of claim 1.

5. The method of claim 1, wherein the gateway is configured to perform the steps of:
   (a) determining whether the terminating station is associated with an account that requires the surcharge to be billed to the account associated with the calling line number; and
   (b) determining whether the account associated with the calling line number is pre-approved to receive the surcharge.

6. In an intelligent switched telecommunications network, a method for billing a surcharge associated with a telecommunication service to an account associated with a calling line number, comprising:
   receiving a connection request defining a communication directed to a terminating station and originating from an originating station associated with the calling line number;
   in response to the connection request,
      querying a local number portability database to obtain a local routing number associated with the calling line number; and
      determining whether the terminating station is associated with an account that requires the surcharge to be billed to the account associated with the calling line number;
   if the terminating station is associated with an account that requires the surcharge to be billed to the account associated with the calling line number, determining whether the account associated with the calling line number is pre-approved to receive the surcharge;
   if the account associated with the calling line number is eligible to receive the surcharge, identifying a service provider having a billing relationship with the account associated with the calling line number by querying a local exchange routing guide database to identify the service provider having a billing relationship with the account associated with the calling line number, wherein the local routing number is included in the query of the local exchange routing guide database;
   determining whether a cross-billing relationship exists with the service provider having the billing relationship with the account associated with the calling line number;
   routing the communication to the terminating station, and
   creating an account record billing the surcharge to the account associated with the calling line number.

7. The method of claim 6, wherein the step of routing the communication to the terminating station comprises:
   playing a prompt that is audible to an operator of the originating station;
   receiving input from the operator of the originating station indicating authorization to bill the surcharge to the account associated with the calling line number; and
   routing the communication to the terminating station.

8. A computer storage medium storing a computer program which, when executed by a computer-controlled apparatus, causes the computer-controlled apparatus to perform the method of claim 6.

9. A computer-controlled apparatus operative for implementing the method of claim 6.

10. In an intelligent switched telecommunications network comprising a terminating station and an originating station associated with an account and a calling line number, an apparatus for billing a surcharge associated with a telecommunication service to an account associated with a calling line number comprising:
   a gateway configured for connection between a telephone system and a switch servicing a group of terminating stations such that all communications directed to the group of terminating stations are routed through the gateway, said gateway operative for:
      receiving a connection request defining a communication directed to a terminating station serviced by the switch connected to the gateway and originating from the originating station, querying a local number portability database to obtain routing instructions for connecting the communication from the originating station to a terminating station;

determining whether the terminating station is associated with an account that requires the surcharge to be billed to the account associated with the calling line number, determining whether the account associated with the calling line number is pre-approved to receive the surcharge if the terminating station is associated with an account that requires the surcharge to be billed to the-account associated with the calling line number; and if the account associated with the calling line number is eligible, to receive the surcharge, identifying a service provider having a billing relationship with the account associated with the calling line number by querying a local exchange routing guide database to identify the service provider having a billing relationship with the account associated with the calling line number;

determining whether a cross-billing relationship exists with the service provider having the billing relationship with the account associated with the calling line number;

routing the communication to the terminating station using the routing instructions; and creating an accounting record billing the surcharge to the account associated with the calling line number.

11. The apparatus of claim 10, wherein the gateway is further operative for determining whether the terminating station is associated with an account that requires the surcharge to be billed to the account associated with the calling line number by querying a subscriber database consisting essentially of account information for accounts associated with terminating stations serviced by the switch connected to the gateway.

12. The apparatus of claim 10, wherein, prior to routing the communication to the terminating station, the gateway is further operative for:

playing an announcement audible to an operator of the originating station requesting authorization to bill the surcharge to the account associated with the calling line number; and receiving input from the operator of the originating station authorizing the surcharge to be billed to the account associated with the calling line number.

13. In an intelligent switched telecommunications network, a method for billing a surcharge associated with a telecommunications service to an account associated with a calling line number, comprising:

receiving, a, call setup request from the originating station including a dialed directory number associated with the terminating station;

based on the dialed directory number, querying a local number portability database to obtain routing instructions for connecting the communication from the originating station to a terminating station;

using the routing instructions to send a signaling channel connection request to a calling-party-pays gateway associated with the terminating station;

in response to the call setup request, determining whether the terminating station is associated with an account that requires the surcharge to be billed to the account associated with the calling line number;

if the terminating station is associated with an account that requires the surcharge to be billed to the account associated with the calling line number, determining whether the account associated with the calling line number is pre-approved to receive the surcharge; and if the account associated with the calling line number is eligible to receive the surcharge, identifying a service provider having a billing relationship with the account associated with the calling line number by querying a local exchange routing guide database to identify the service provider having a billing relationship with the account associated with the calling line number;

determining whether a cross-billing relationship exists with the service provider having the billing relationship with the account associated with the calling line number; and routing the communication to the terminating station.

14. The method of claim 13, wherein the step of routing the communication to the terminating station comprises:

playing a prompt that is audible to an operator of the originating station;

receiving input from the operator of the originating station indicating authorization to bill the surcharge to the account associated with the calling line number;

creating an accounting record in a call detail record database billing the surcharge to the account associated with the calling line number; and routing the communication to the terminating station.

15. A computer storage medium storing a computer program which, when executed by a computer-controlled apparatus, causes the computer-controlled apparatus to perform the method of claim 13.

16. A computer-controlled apparatus operative for implementing the method of claim 13.

17. The method of claim 13, wherein the gateway is configured to perform the steps of:

(a) determining whether the terminating station is associated with an account that requires the surcharge to be billed to the account associated with the calling line number; and (b) determining whether the account associated with the calling line number is pre-approved to receive the surcharge.

* * * * *